United States Patent
Ben David et al.

(10) Patent No.: US 12,513,191 B2
(45) Date of Patent: *Dec. 30, 2025

(54) AUTOMATED SOCIAL MEDIA-RELATED BRAND PROTECTION

(71) Applicant: IntSights Cyber Intelligence Ltd., Tel Aviv (IL)

(72) Inventors: Gal Ben David, Petah Tikva (IL); Amir Hozez, Ganei Tiqwa (IL); Alon Arvatz, Raanana (IL); Guy Nizan, New York, NY (US)

(73) Assignee: IntSights Cyber Intelligence Ltd., Tel Aviv-Jaffa (IL)

( * ) Notice: Subject to any disclaimer, the term of this patent is extended or adjusted under 35 U.S.C. 154(b) by 116 days.

This patent is subject to a terminal disclaimer.

(21) Appl. No.: 18/467,624

(22) Filed: Sep. 14, 2023

(65) Prior Publication Data
US 2024/0007502 A1    Jan. 4, 2024

Related U.S. Application Data

(63) Continuation of application No. 17/108,193, filed on Dec. 1, 2020, now Pat. No. 12,052,281.

(30) Foreign Application Priority Data

Dec. 22, 2019  (IL) .......................................... 271648

(51) Int. Cl.
*H04L 9/40* (2022.01)
*G06F 16/951* (2019.01)
(Continued)

(52) U.S. Cl.
CPC ........ *H04L 63/1483* (2013.01); *G06F 16/951* (2019.01); *G06F 40/30* (2020.01); *H04L 63/1416* (2013.01); *H04L 67/306* (2013.01)

(58) Field of Classification Search
USPC ........................................................... 726/24
See application file for complete search history.

(56) References Cited

U.S. PATENT DOCUMENTS

| 8,347,381 | B1 | 1/2013 | Gauvin |
| 10,599,774 | B1 * | 3/2020 | Luo ........................ G06N 3/084 |

(Continued)

FOREIGN PATENT DOCUMENTS

CA    3 058 884 A1    4/2020

OTHER PUBLICATIONS

Notice of Deficiencies for Israeli Application No. 271648 dated Jul. 18, 2022.

*Primary Examiner* — Sakinah White Taylor
(74) *Attorney, Agent, or Firm* — Wolf, Greenfield & Sacks, P.C.

(57) ABSTRACT

A method for defending against malicious profiles on the web, the method including: i) inspecting a profile to determine its relevance to a brand that it is desired to protect from malicious activity; ii) determining whether the profile is relevant to the brand; iii) if it is determined that the profile is relevant, analyzing it to determine whether it is legitimate or malicious; and iv) if it is determined that the profile is malicious, assembling proof of its malicious activity and submitting same together with a takedown request to the administrator of the website where the profile was located.

19 Claims, 1 Drawing Sheet

(51) Int. Cl.
    *G06F 40/30*     (2020.01)
    *H04L 67/306*     (2022.01)

(56) References Cited

U.S. PATENT DOCUMENTS

| | | |
|---|---|---|
| 11,165,813 B2 | 11/2021 | Stolarz et al. |
| 11,393,007 B2 * | 7/2022 | Rose .................. G06Q 30/0631 |
| 2010/0186088 A1 | 7/2010 | Banerjee et al. |
| 2013/0263272 A1 | 10/2013 | Banerjee et al. |
| 2016/0055490 A1 | 2/2016 | Keren et al. |
| 2017/0161797 A1 * | 6/2017 | Fish ...................... H04L 67/535 |
| 2017/0228804 A1 * | 8/2017 | Soni ...................... H04L 67/535 |
| 2018/0124110 A1 | 5/2018 | Hunt et al. |
| 2018/0189359 A1 | 7/2018 | Jenkins |
| 2018/0376185 A1 | 12/2018 | Lonstein et al. |
| 2019/0087889 A1 | 3/2019 | Rice |
| 2019/0261222 A1 | 8/2019 | Raleigh et al. |
| 2020/0053111 A1 * | 2/2020 | Jakobsson ........... H04L 63/1416 |
| 2020/0067961 A1 | 2/2020 | Qin et al. |
| 2021/0194923 A1 | 6/2021 | Ben David et al. |

\* cited by examiner

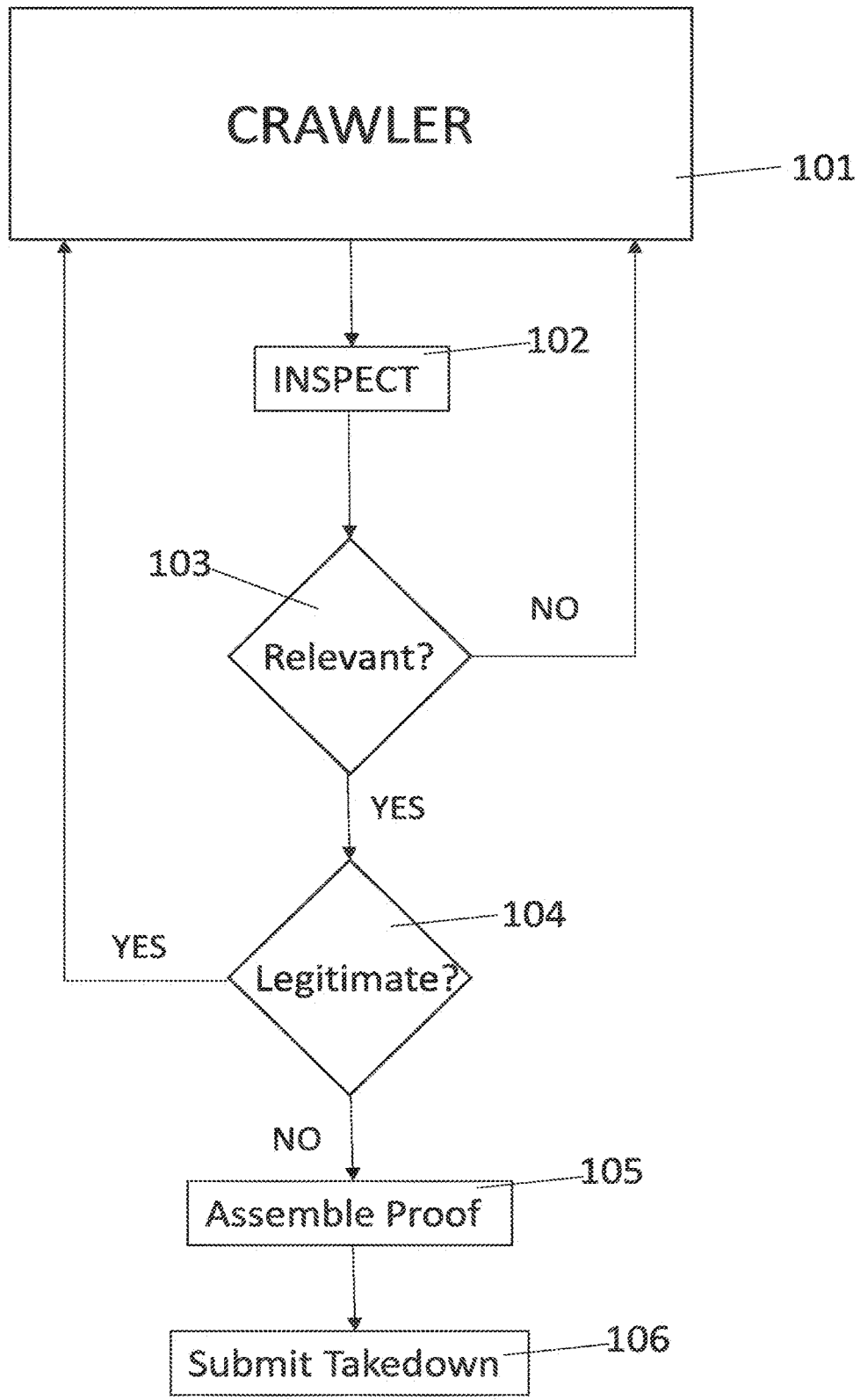

AUTOMATED SOCIAL MEDIA-RELATED BRAND PROTECTION

This application is a continuation of and claims priority under 35 U.S.C. § 120 to U.S. patent application Ser. No. 17/108,193, titled "AUTOMATED SOCIAL MEDIA-RELATED BRAND PROTECTION", filed Dec. 1, 2020, which claims priority under 35 U.S.C. § 119 to Israeli application number 271648, titled "AUTOMATED SOCIAL MEDIA-RELATED BRAND PROTECTION", filed Dec. 22, 2019, each of which is incorporated by reference herein in its entirety.

FIELD OF THE INVENTION

The present invention relates to the protection of brands from Internet threats. More particularly, the invention relates to an automated method and system for locating and removing malicious social media profiles.

BACKGROUND OF THE INVENTION

Every business nowadays must have Internet presence, to allow users and customers easy access to their services and products. Malicious actors, however, take advantage of the businesses presence to mislead the public into believing that profiles they create belong to a specific organization, and thereby they manage to conduct illicit operations, such as phishing, identity and data theft, and the like.

In view of the proliferation of malicious profiles with false identities on social media, organizations that wish to prevent malicious agents from taking advantage of their brand in order to perform scamming operations on the public, need to constantly search for such profiles, collect evidence as to their malicious nature, and petition the relevant social media for a takedown of said profile. The problem also extends to false profiles purporting to belong to important clients of the organization, which may have an important impact as opinion leaders. Those also have to be identified and removed. As will be easily understood, this is an undertaking that is not only extremely time-consuming, but which also may not be able to locate all malicious profile, and to deal with them in real time. Accordingly, it would be highly desirable to be able to provide a method and system that can overcome these limitations.

It is therefore an object of the present invention to provide a method that allows for the automated identification, analysis, and takedown of malicious profiles on social media, which does not require time-consuming human intervention.

It is another object of the invention to provide a system that can efficiently perform said method.

Other objects and advantages of the invention will become apparent as the description proceeds.

SUMMARY OF THE INVENTION

In one aspect, the invention relates to a method for defending against malicious profiles on the web, comprising the steps of:
i) Inspecting a profile to determine its relevance to a brand that it is desired to protect from malicious activity;
ii) determining whether said profile is relevant to said brand;
iii) if it is determined that said profile is relevant, analyzing it to determine whether it is legitimate or malicious;
iv) if it is determined that the profile is malicious, assembling proof of its malicious activity and submitting same together with a takedown request to the administrator of the website where the profile was located.

According to one embodiment of the invention, inspecting comprises generating a list of items to be considered, which are used to make the determination as to the relevance of the profile, said list of items including, for instance, items selected from names, sentences, terms, logos and other relevant images.

In one embodiments of the invention the relevance of the profile is performed by comparing the list of items thereof with a list of brand related items, and if sufficient relation is found between said lists, determining that the profile is relevant. In another embodiment of the invention determining the relevance of the profile includes performing natural language analysis of sentences found in the profile.

In a further embodiment of the invention, the determination of the legitimacy of the profile is carried out by combining the probability of each of a plurality of parameters of the profile, of being malicious. The parameters may include, but are not limited to, the level of activity, the creation date, the level of engagement, the number of friends listed on the profile, the number of photographs uploaded to the profile, the number of likes of a commercial page, etc. When taking into account the probabilities as described above, the profile is considered to be malicious if the combined probability exceeds a predetermined threshold.

Of course, before it is possible to analyze it, the profile to be inspected is to be located, and in some embodiments of the invention this is done using a web crawler, but of course any other suitable method of pointing at potentially suspicious profiles would be applicable.

The Invention also encompasses a system for defending against malicious profiles on the web, comprising separately or integrated into one or more circuitry,
1) circuitry for providing crawling of the web;
2) circuitry for comparing data relative to a profile to a set of data relative to a brand;
3) logic circuitry for determining the relevance of the profile based on said comparison;
4) logic circuitry adapted to determining the legitimacy of a relevant profile;
5) circuitry for assembling evidence of malicious activity of a profile; and
6) circuitry for operating software suitable to automatically fill-in takedown requests;
7) hardware suitable to operate each of the abovementioned circuitries.

BRIEF DESCRIPTION OF THE DRAWINGS

In the drawings:
FIG. 1 illustrates the flow of the method of the invention, according to one embodiment thereof.

DETAILED DESCRIPTION OF THE INVENTION

In the context of this description the term "social media" should be given the broadest interpretation, and should be taken to include any web-based service, which allows users to identify themselves by opening what is commonly referred to as "a profile", as well as to upload data, images and any other type of information. Illustrative examples of such social media include, for example, Facebook, Instagram, YouTube, etc.

In order to facilitate the understanding of the threat that the invention addresses, the following is an example. Company "TelCom" Is a well-known and large telecommunication Corporation. Because of its renown, several malicious social media profiles have been found, purporting to offer discounts to holders of TelCom accounts, offering special reduced rates to new customers, etc. A gullible individual following links on one of those profiles will be led into leaving personal and credit card details, which can be used to steal money and/or identities. The damage will then be linked to the name of TelCom, causing severe damage to the brand. Malicious profiles can also be used to sell competing products or services to customers who believe that they are purchasing them from the original company, thus causing direct monetary damage to the business.

When inspecting a social media profile using artificial intelligence tools, different challenges present themselves. For instance, the brand may be similar or identical to a person's name, rendering its characterization difficult. Furthermore, a page that at first sight may seem malicious, may in fact be legitimate. For example, a page purporting to advertise deals for products of a certain company, which page does not belong to that company, may belong to a legitimate distributor of that company, who has not adhered to advertising rules set forth by the company and, therefore, may at first sight appear to be a malicious page, while in fact it is legitimate. The same may happen with posts, for instance if a page containing a post titled "hacked TelCom accounts" (which appears to invite interested parties to unlawfully exploit users' accounts that have been hacked) may be confused with a post titled "my TelCom account was hacked", which a user has created to vent his frustration at having been hacked, which of course is legitimate.

Having now a better understanding of the challenges, reference is made to FIG. 1, which explains the method of the invention by way of description of one illustrative embodiment thereof. FIG. 1 shows the process of reviewing one social media website in respect of one specific brand. Of course, this is a simplified illustration and, as will be apparent to the skilled person, the invention allows to perform in parallel on a plurality of websites, as well as to perform the review in parallel in respect of a plurality of brands. In the embodiment of FIG. 1, step 101 initiate the process by applying a crawler to the website, searching for suspicious profiles related to the specific brand (e.g., the TelCom brand). Searching involves not only the brand name, but also logos identical or similar to those employed by TelCom. If the fake profile is that of a customer of the company, then photographs of the person may also be searched. Searching for images such as logos and people photographs can be performed using techniques known per se, which are therefore not discussed herein in detail, for the sake of brevity.

When a profile is inspected in step 102, its relevance is first determined in step 103, on the basis of whether names and logos or other images of interest are found, such as product images, individuals, etc. If it is determined that the profile is not relevant to the brand, the next profile is inspected. When a profile is found to be relevant, step 104 analyzes it to determine whether it is a legitimate profile, and if it is found to be legitimate, the next profile is inspected. A legitimate profile does not necessarily need to be one belonging to the brand itself. For instance, it can be a profile of a distributor of the brand, or that of someone who reviews products of that brand, or as in the example given above, simply someone who has complaints related to the brand. Accordingly, natural language analysis is incorporated in this review, to extract the meaning of titles and sentences associated with the profile. As will be apparent to the skilled person, natural language analysis can be performed using any of the methods and programs available in the art, which therefore are also not discussed herein in detail, for the sake of brevity.

If step 104 determines that a profile is malicious, as will be further explained below, then proof of its illegitimacy is collected in step 105. The proof collected in step 105 is submitted to the appropriate website administrator, together with a takedown request, in step 106. In order to perform step 106, the system maintains appropriate takedown forms for the various social media websites crawled, along with filling-in routines appropriate for the requirement of each website.

Relevance

Returning now to step 103, inspection step 102 generates a list of items to be considered, including names, sentences, terms, and logos, which are used to make the determination as to the relevance of the profile. This list is compared with a list of brand-related items, and if sufficient relation is found between said lists, the profile is considered to be relevant and worthy of further analysis.

Legitimacy

In order to determine whether a relevant profile is legitimate, an analysis is carried out including a plurality of elements, for instance:

How active is the profile. If information is not posted regularly, or the gap between posts is a substantial, this may be an indication that the profile is malicious.

When was the profile created. Recent profiles are more suspicious than established ones.

Engagement. If the profile shows active engagement from independent sources, then the chances of it being legitimate increase.

Friends. Legitimate, active profiles typically have several friends (who also can be followed to determine that they are real). A profile with very few or no friends has a greater chance of being malicious.

Likes. When the inspected profile is a commercial page, the number of likes is also relevant to the determination of its legitimacy. If little or no likes exist, this may be indicative of a malicious page.

Photographs. Legitimate profile owners typically post photographs regularly. The absence of such regular posting of photographs may indicate a malicious profile.

Of course, the above parameters are only a partial list, provided for the purpose of illustration, and several additional parameters can be analyzed, which will be apparent to the skilled person and, therefore, are not discussed herein for the sake of brevity. According to the invention, each of the above, and other parameters, is assigned a probability for illegitimacy. Combining the probabilities for each parameter allows the system to determine whether the profile is legitimate or not, if the combined probability for illegitimacy Is greater than a predetermined threshold. Depending on the importance of the subject analyzed, the frequency with which malicious profiles are determined, and any other consideration that may become relevant, the system administrator may apply a more or less stringent threshold to this determination.

The system for carrying out the method of the invention comprises several modules, which can be provided separately or integrated into one or more circuitry. These include circuitry for providing crawling of the web, circuitry for comparing data relative to a profile to a set of data relative to a brand, logic circuitry for determining the relevance of the profile based on said comparison, logic circuitry adapted to determining the legitimacy of a relevant profile, circuitry for assembling evidence of malicious activity of a profile, and circuitry for operating software suitable to automatically fill-in takedown requests. Providing hardware suitable to operate each of the abovementioned modules is within the scope of the men of the art and, therefore, is not described herein in detail.

All the above description and examples have been provided for the purpose of illustration and are not meant to limit the invention in any way, except as provided for by the claims.

The invention claimed is:

1. A method for defending against malicious profiles on the web, the method comprising:
   using circuitry to perform:
      determining whether a profile identified from a website is relevant to a brand;
      when it is determined that the profile is relevant to the brand, determining whether the profile is a legitimate profile or a malicious profile by analyzing the profile, the analyzing comprising:
         analyzing parameters of the profile to determine values for the parameters of the profile;
         comparing the determined values for the parameters of the profile to respective thresholds; and
         determining the profile is a malicious profile based on results of comparing the determined values for the parameters of the profile to the respective thresholds; and
      when it is determined that the profile is a malicious profile:
         assembling proof of malicious activity associated with the profile, and
         submitting the assembled proof and a takedown request to an administrator of the website.

2. The method of claim 1, wherein determining whether the profile identified from the website is relevant to the brand comprises:
   generating a list of items from information in the profile; and
   determining whether the profile identified from the website is relevant to the brand using the list of items.

3. The method of claim 2, wherein the list of items includes items selected from names, sentences, terms, logos and images, contained within the profile.

4. The method of claim 2, wherein determining whether the profile identified from the website is relevant to the brand using the list of items comprises:
   comparing the list of items with a predetermined list of brand related items; and
   determining whether the profile is relevant to the brand based on results of the comparing of the list to the predetermined list.

5. The method of claim 1, wherein the parameters of the profile include: a level of activity, a creation date, a level of engagement, a number of friends listed on the profile, a number of photographs uploaded to the profile, and a number of likes of the profile.

6. The method of claim 1, further comprising:
   prior to determining whether the profile identified from the website is relevant to the brand, searching, using a web crawler, the website to identify the profile, based on a name of the brand and images associated with the brand.

7. The method of claim 1, further comprising:
   based on the comparing, assigning a respective probability the profile is a malicious profile to each of the parameters, wherein determining the profile is a malicious profile is based on the respective probabilities.

8. The method of claim 1, further comprising:
   determining a combined value by combining the respective value of each of the parameters, wherein the comparing comprises comparing the combined value to a threshold combined value.

9. A method for defending against malicious profiles on the web, comprising:
   using circuitry to perform:
      searching, using a web crawler, a website to identify a profile, based on a name of a brand and one or more images associated with the brand;
      when the profile is identified from the website, determining whether the profile is relevant to the brand by:
         generating a list of items from information in the profile;
         comparing the list of items with a predetermined list of brand related items; and
         determining whether the profile is relevant to the brand based on results of the comparing;
      when it is determined that the profile is relevant to the brand, analyzing the profile to determine whether the profile is a legitimate profile or a malicious profile; and
      when it is determined that the profile is a malicious profile, assembling proof of malicious activity associated with the profile and submitting the assembled proof and a takedown request to an administrator of the website.

10. The method of claim 9, wherein the list of items includes items selected from names, sentences, terms, logos and images, contained within the profile.

11. The method of claim 9, wherein parameters of the profile include: a level of activity, a creation date, a level of engagement, a number of friends listed on the profile, a number of photographs uploaded to the profile, and a number of likes of the profile.

12. The method of claim 9, wherein analyzing the profile to determine whether the profile is a legitimate profile or a malicious profile comprises:
   analyzing parameters of the profile to determine a value for each of the parameters;
   comparing the determined value for each parameter to a respective threshold; and
   determining the profile is a malicious profile based on the comparing of the determined values to the respective thresholds.

13. The method of claim 12, further comprising:
   based on the comparing of the determined values to the respective thresholds, assigning a respective probability the profile is a malicious profile to each of the parameters, wherein determining the profile is a malicious profile is based on the respective probabilities.

14. The method of claim 12, further comprising:
   determining a combined value by combining the respective value of each of the parameters, wherein the comparing of the determined values to the respective thresholds comprises comparing the combined value to a threshold combined value.

15. A system for defending against malicious profiles on the web, comprising:
  circuitry configured to perform:
    determining whether a profile identified from a website is relevant to a brand;
    when it is determined that the profile is relevant to the brand, analyzing the profile to determine whether the profile is a legitimate profile or a malicious profile, the analyzing comprising:
      analyzing parameters of the profile to determine values for the parameters of the profile;
      comparing the determined values for the parameters of the profile to respective thresholds; and
      determining the profile is a malicious profile based on results of comparing the determined values for the parameters of the profile to the respective thresholds; and
    when it is determined that the profile is a malicious profile:
      assembling proof of malicious activity associated with the profile, and submitting the assembled proof and a takedown request to an administrator of the website.

16. The system of claim 15, wherein determining whether the profile identified from the website is relevant to the brand comprises:
  generating a list of items from information in the profile; and
  determining whether the profile identified from the website is relevant to the brand using the list of items.

17. The system of claim 16, wherein the list of items includes items selected from names, sentences, terms, logos and images, contained within the profile.

18. The system of claim 16, wherein determining whether the profile identified from the website is relevant to the brand using the list of items comprises:
  comparing the list of items with a predetermined list of brand related items; and
  determining whether the profile is relevant to the brand based on results of the comparing of the list to the predetermined list.

19. The system of claim 15, wherein the circuitry is further configured to perform:
  before determining the profile is a malicious profile, based on the comparing, assigning a respective probability the profile is a malicious profile to each of the parameters, wherein determining the profile is a malicious profile is based on the respective probabilities.

* * * * *